United States Patent
Stephan et al.

(10) Patent No.: US 7,032,095 B2
(45) Date of Patent: Apr. 18, 2006

(54) DATA PROCESSING SYSTEM AND METHOD

(75) Inventors: Yann Stephan, Echirolles (FR); Paul Neuman, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 10/413,385

(22) Filed: Apr. 15, 2003

(65) Prior Publication Data

US 2004/0039724 A1 Feb. 26, 2004

(30) Foreign Application Priority Data

Apr. 23, 2002 (EP) .................................. 02354067

(51) Int. Cl.
*G06F 12/10* (2006.01)

(52) U.S. Cl. .................................................... 711/202

(58) Field of Classification Search ................ 711/202, 711/203, 206, 207
See application file for complete search history.

(56) References Cited

U.S. PATENT DOCUMENTS 5,784,701 A * 7/1998 Greenstein et al. ......... 711/173
6,167,511 A   12/2000 Lewis
6,462,745 B1 * 10/2002 Behrbaum et al. .......... 345/543
6,792,520 B1 *  9/2004 Qureshi et al. ............. 711/170

FOREIGN PATENT DOCUMENTS

WO WO 01/46803 6/2001
WO WO 01/88718 11/2001

OTHER PUBLICATIONS

Robinson, "Welcome to . Memory Management", 1994, pp. 37-42.*

* cited by examiner

*Primary Examiner*—Kevin L. Ellis
(74) *Attorney, Agent, or Firm*—Foley & Lardner LLP

(57) ABSTRACT

The present invention relates to a data processing system method and, more particularly, to a system and method for manipulating CMOS parameters that are stored within a CMOS memory, via a user interface other than the conventional BIOS set up program. Embodiments of the present invention use a Root System Description Table Pointer as prescribed by the Advanced Configuration and Power Interface specification to read an operating system accessible table contained within conventional memory. The table stores access data to allow access to at least a subset of the BIOS CMOS parameters. Advantageously, since the access data for the CMOS parameters are stored within conventional memory, a user interface that is more sophisticated than a conventional BIOS set up program user interface can be used for manipulating those values. Still further, tokens are used to present a system independent way of representing the CMOS parameters to higher level programs. These tokens may remains constant regardless of underlying changes to the CMOS parameters.

14 Claims, 3 Drawing Sheets

DATA PROCESSING SYSTEM AND METHOD

FIELD OF THE INVENTION

The present invention relates to a data processing system and method and, more particularly, to such a system and method for accessing the physical address space of a computer system.

BACKGROUND TO THE INVENTION

During the POST the BIOS retrieves, from a CMOS memory, values that are used to initialise various devices within a computer system. The BIOS interrogates each device in turn to determine its register requirements. The BIOS retrieves values from the CMOS memory that are appropriate to the device. As a system administrator adds devices to or removes devices from the computer system, the parameters stored by the CMOS will have be changed accordingly. Conventionally, these changes are achieved using a CMOS or BIOS set up program. The BIOS set up is a set of procedures that enable a computer to be configured according to its resident hardware. It allows, amongst other things, the user to change the parameters with which the BIOS configures the chipsets, storage devices, memory configuration etc. The BIOS set up can be entered, when the computer system is powered on, by depressing a key during, or immediately before, the POST. The key varies according to computer system or BIOS manufacturer but, in some instances, can be the F2 key or the del key.

The BIOS set up provides a very basic user interface with very limited graphics capabilities via which the CMOS parameters can be varied. To exacerbate matters, there has been little standardisation of terminology between BIOS vendors and the many chipset and motherboard vendors. Furthermore, some parameters are defined by BIOS vendors, some by chipset designers and some by motherboard designers. Parameters intended for use in design and development are intermixed with parameters intended to be adjusted by technicians.

Still further, the very limited graphical user interface presented by the BIOS set up does not comply with, for example, US requirements for providing a user interface that can be used by the blind.

It is an object of the present invention at least to mitigate some of the problems of the prior art.

SUMMARY OF INVENTION

Accordingly, a first aspect of the present invention provides a data processing system comprising an operating system and a physical address space; the physical address space being inaccessible by the operating system; the system further comprising a first data structure, accessible by the operating system, for providing a mapping between at least one entry in the data structure and a corresponding address; the corresponding address being a physical address in the physical address space.

Suitably, operating system level software and higher application can gain access to data relating to the physical address space that, in the absence of embodiments of the present invention, would remain inaccessible.

Preferably, embodiments provide a data processing system in which the first data structure comprises at least one index to locate within the first data structure the mapping between the at least one entry and the corresponding address.

Often devices that are mapped into the physical address space need to occupy a number of physical addresses. Accordingly, embodiments provide a data processing system in which the data structure comprises a first plurality of indices which relate to at least one of a first device mapped into the physical address space or first respective addresses of a portion of the physical address space. Therefore, data relating to the physical address space of a device is made available to operating system level programs and higher level programs.

It will be appreciated that computer systems contain more than one device. Suitably, embodiments provide a data processing system in which the data structure comprises a second plurality of indices which relate to at least one of a second device mapped into the physical address space or second respective addresses of a portion of the physical address space. Therefore, the address spaces of more than one device or related physical addresses can be grouped together within the data structure.

Preferred embodiments provide a data processing system in which the first data structure is a first power management data structure. Preferably, the first data structure is an ACPI data structure such as, for example, a table. Using user-defined ACPI tables provides a convenient way to provide information relating to the physical address space to the operating system and higher level programs.

The ACPI table can be conveniently located using a second data structure such as, for example, an ACPI pointer, that is, using the Root System Description Table Pointer, together with an appropriate entry in the Root System Description Table.

Preferred embodiments provide a data processing system in which the physical address space corresponds to a memory for storing set-up data for initialising the data processing system. Preferably, the memory is a CMOS memory and the set-up data are the CMOS parameters.

Preferred embodiments provide a computer program element comprising code means for implementing a system as described herein and a computer program product comprising a computer readable storage medium having stored thereon such a computer program element.

Preferred embodiments provide a data processing system in which the user interface comprises at least one of a graphical user interface that outputs a graphical representation of at least a first one of the entries in the first data structure together with a first corresponding address associated with that first entry and an audible user interface that outputs an audible representation of at least a first one of the entries of the first data structure together with an audible representation of a first corresponding address associated with that first entry. Suitably, various types of user interface may be provided to allow access to the physical address space. Since, for example, CMOS parameters can be accessed using an operating system program or higher level program, that is, a program other than a BIOS program, a much richer user interface can be presented to the user in embodiments of the present invention.

The ACPI specification allows computer vendors to provide proprietary power management functions that can be accessed using corresponding tables. However, embodiments of the present invention use the ability of ACPI to such proprietary tables to allow access to the CMOS parameters. Suitably, preferred embodiments provide a data processing system in which the power management pointer is a Root System Description Table Pointer. Preferably, embodiments provide a data processing system further comprising a second data structure, accessed via the power management pointer, which contains an entry to allow access to the first data structure.

Preferred embodiments provide a data processing system in which the user interface is an audible user interface that outputs an audible representation of the set up data contained within the data structure.

BRIEF DESCRIPTION OF THE DRAWINGS

Embodiments of the present invention will now be described, by way of example only, with reference to the accompanying drawings in which.

DESCRIPTION OF PREFERRED EMBODIMENTS

Figure 1:
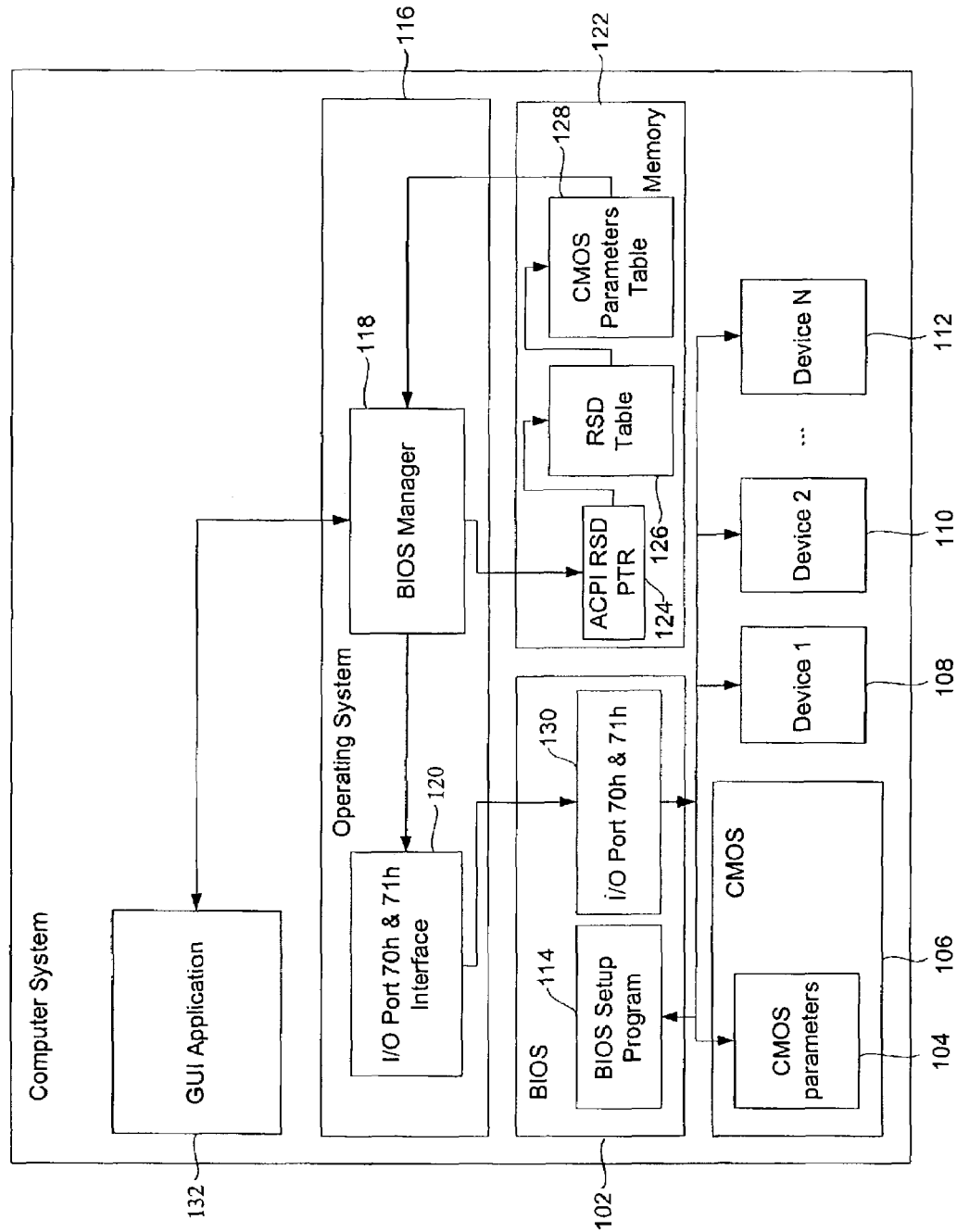
FIG. 1 illustrates a computer system according to a first embodiment of the present invention.

Referring to FIG. 1, there is shown a computer system 100 having a BIOS 102, which performs a POST and initialises, using CMOS parameters 104 stored within a CMOS memory 106, various hardware devices 108 to 112. The BIOS 102 may optionally contain a conventional BIOS set up program 114. The BIOS 102 comprises a pair 130 of interrupt routines, I/O 70h and I/O 71h, that are used to access and change the CMOS parameters 104 contained with the CMOS memory 106. The computer system 100 also comprises an operating system 116 that contains a BIOS manager 118 for managing the CMOS parameters 104. The operating system has an I/O 70h and I/O 71h interface 120 by which the BIOS manager 118 can change the CMOS parameters 104. The computer system 100 has a RAM memory 122, which contains an ACPI Root System Description Table Pointer 124 as is well known within an ACPI power management context. The pointer 124 points to a Root System Description Table 126, which contains the locations of further tables (not shown) that are used to establish a power management context for the computer system 100, that is, they are used to manage the power consumption of the computer system 100.

One of the entries in the Root System Description Table 126 points to a CMOS parameters table 128, which contains access data to allow access to the CMOS parameters 104 stored within the CMOS memory 106. The access data provide an indication of the format and location within the CMOS memory 106 of corresponding CMOS parameters, that is, the access data maps to the physical address space of the system 100. The BIOS manager 118 uses the CMOS parameters table 128, in conjunction with the I/O ports 70h and 71h 130, to access and change the CMOS parameters 104. Preferably, the BIOS manager 118 comprises, or uses, a user interface 132, other than the conventional BIOS set up user interface, to access the parameters.

Figure 2:
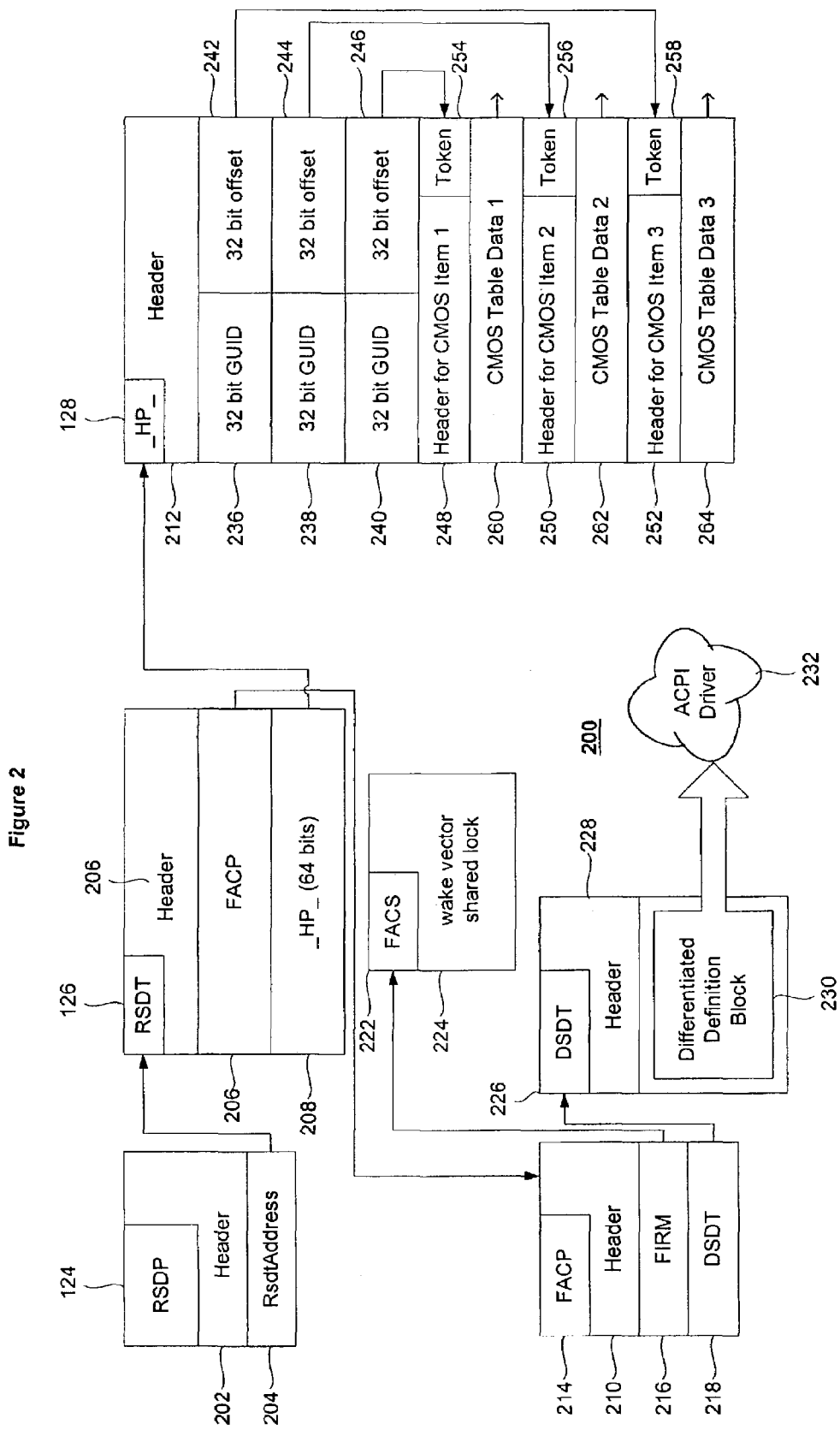
FIG. 2 shows data structures used in the first embodiment.

Referring to FIG. 2, the pointer 124 and the two tables 126 and 128 are shown in greater detail. The RSD PRT 124 has the 36-byte format prescribed by the ACPI standard and Errata. This RSD PRT 124 comprises a header 202, which includes an 8-byte signature, a one byte checksum, which should be zero, a 6-byte OEMID and a 4-byte RsdtAddress 204, which points to the physical address of the Root System Description Table 126. It should be noted that all table headers comply with this format.

The Root System Description Table 126 also has a format prescribed by the above standard. The table 126 comprises a 4-byte ASCII string 206 representation of a table identifier, FACP. Similarly, each entry within the RSD table 126 has a format that is also prescribed by the ACPI standard. Table 1 below provides an example of an RST Table 126.

TABLE 1

| Field | Byte Length | Byte Offset | Description |
|---|---|---|---|
| Header | | | |
| Signature | 4 | 0 | 'RSDT'. Signature for the Root System Description Table. |
| Length | 4 | 4 | Length, in bytes, of the entire Root System Description Table. The length defines the number of Entry fields at the end of the table. |
| Revision | 1 | 8 | 1 |
| Checksum | 1 | 9 | Entire table must sum to zero. |
| OEMID | 6 | 10 | OEM ID. |
| OEM Table ID | 8 | 16 | For the Root System Description Table, the table ID is the manufacturer's model ID. |
| OEM Revision | 4 | 24 | OEM revision of RSDT table for supplied OEM Table ID. |
| Creator ID | 4 | 28 | Vendor ID of utility that created the table. For the DSDT, RSDT, SSDT, PSDT tables, this is the ID for the ASL Compiler. |
| Creator Revision | 4 | 32 | Revision of utility that created the table. For the DSDT, RSDT, SSDT, and PSDT tables, this is the revision for the ASL Compiler. |
| Entry | 4*n | 36 | An array of physical addresses that point to other DESCRIPTION_HEADERs. The OS assumes at least the DESCRIPTION_HEADER is addressable, and then can further address the table based upon its Length field. |

It will be appreciated from FIG. 2 that the RSDT 126 contains two entries 206 and 208 that contain 32-bit addresses that point to description headers 210 and 212 of an FACP table 214 and the CMOS parameters table 128 respectively. As is conventional, the FACP table 214 contains pointers, FIRM 216 and DSDT 218, that point to address information of a FACS table 222 at which a wake up vector 224 can be found and a Differentiated System Description Table 226, containing an associated header 228 and Differentiated Definition Block 230, which links to an associated ACPI driver 232. Although the addresses are indicated as being a 32-bit, other address sizes, such as 64-bit addresses, could equally well be used.

The CMOS parameters table 128 is identified using the four ASCII characters "_HP_". The table contains the header 212 and a number of references or indices 236 to 240, which each have an associated address or offset 242 to 246. The references and addresses 236 to 240 point to respective CMOS entries, which comprise headers 248 to 252 and corresponding tokens 254 to 258. Each CMOS header 248 to 252 contains a description of the format of respective CMOS parameter access data 260 to 264 used to access the physical address space occupied by the CMOS parameters 104. These access data 260 to 264 allow the BIOS manager 118 to access the CMOS parameters 104, contained within the CMOS memory 106. It will be appreciated that the GUIDs are used to locate physical addresses of the CMOS parameters.

The BIOS manager 118 can read and amend the CMOS parameters 104 using the CMOS parameters access data 260 to 264 via the pair 130 of I/O ports 70h and 71h. Furthermore, since the tokens 254 to 258 and CMOS parameters access data items 260 and 264 are stored within the CMOS parameters table 128, they are accessible via the operating system, that is, they are stored within conventional RAM. This means that the CMOS parameters access data 260 to 264 and, hence, the CMOS parameters 104, can be manipulated using a much richer user interface 132. The user interface 132 may be a graphical user interface in which the CMOS parameters, accessed using the CMOS parameters access data 260 to 264, are represented graphically. Alternatively, or additionally, the user interface may be an audio user interface via which the CMOS parameters 104, accessed using the CMOS parameter access data 260 to 264, are represented audibly.

The BIOS manager 118 uses the I/O ports 70h and 71h interface 120 to access the CMOS parameters 104 via the pair 130 of I/O ports 70h and 71h. The I/O ports 70h and 71h 130 are used, via AL and AH, to access and modify the CMOS parameters 104. Therefore, in use, the BIOS manager 118 can be used to read any one of the CMOS parameter access data 260 to 264 stored within the CMOS parameters table 128 from RAM memory 122 and manipulate a corresponding CMOS parameter as the user sees fit.

Table 2 below shows an example of a CMOS parameters table 128.

TABLE 2

| Field | Byte Length | Byte Offset | Description |
|---|---|---|---|
| Header | | | |
| Signature | 4 | 0 | ' HP '. Signature for the HP Table. |
| Length | 4 | 4 | Length, in bytes, of the entire HP Table. The length defines the number of Entry fields at the end of the table. |
| Revision | 1 | 8 | 1 |
| Checksum | 1 | 9 | Entire table must sum to zero. |
| OEMID | 6 | 10 | For instance: "HPINVT" |
| OEM Table ID | 8 | 16 | For the HP Table, the table ID is the manufacture model ID. |
| OEM Revision | 4 | 24 | OEM revision of HP table for supplied OEM Table ID. |
| Creator ID | 4 | 28 | Vendor ID of utility that created the table. |
| Creator Revision | 4 | 32 | Revision of utility that created the table. |
| Number of GUIDs | 4 | 36 | Number of GUIDs present in this table |

TABLE 2-continued

| Field | Byte Length | Byte Offset | Description |
|---|---|---|---|
| GUID | 4 | 40 | GUID identification |
| GUID entry | 4 | 44 | Address of a GUID descriptor, 32-bits physical address |
| . | . | . | . |
| GUID xxx | 4 | xx | GUID identification |
| GUID entry | 4 | xx | Address of a GUID descriptor, 32-bits physical address |
| Table entry | X | Xx | Unknown size—All necessary data |

The number of CMOS parameters accessible by the table 128 is determined by the four bytes that correspond to the field "Number of GUIDs". The GUIDs 236 to 240 provide a description of the elements in the table 128. An example of a GUID entry and associated 32-bit address is shown in Table 3 below.

TABLE 3

| GUID: 0x10000001 | |
|---|---|
| 31                         24 23                                    0 | |
| 1000 0000         000000000000000000000001 | |

Immediately following each GUID 236 to 240 is a corresponding 32 bit offset 242 to 246, which contains a four byte offset physical address of a respective header 248 to 252 for the CMOS table entries and associated tokens 254 to 258. Each token 254 to 258 is an operating system independent token, used by external software, such as the BIOS manager 118, to identify consistently an associated CMOS parameter. The tokens 254 to 258 are mapped to corresponding CMOS parameter access data 260 to 264. The CMOS parameter access data 260 to 264 are used to locate corresponding CMOS parameters within the CMOS 106, that is, the access data corresponds to the physical address space of the computer system 100 containing the CMOS memory 106. Furthermore, the headers 248 to 252 contain additional information relating to the interpretation of the associated CMOS parameters 104. For example, assuming that one of the CMOS parameters relates to enabling and disabling COM port A. External software, without further information, could locate and read the table entry corresponding to corn port A but would not know whether the located "1" or "0" represents enable or disable. Suitably, preferred embodiments contain a further field, "Extra Information", as is illustrated in Table 4 below. The "Extra Information" field is used to resolve ambiguities such as that described above.

TABLE 4

| Offset | Name | Length | Value | Description |
|---|---|---|---|---|
| 00h | Length | WORD | 0x10 | Length in bytes of the entire CMOS item Table |
| 02h | Version | WORD | 0x0100 | MSB: Major Version LSB: Minor Version Current Version: 0x0100 – V1.0 |
| 04h | Revision | BYTE | Varies | From 1 to FFh |
| 05h | Checksum | BYTE | Varies | Checksum of the entire table. Entire table must sum to zero |
| 06h | HP TOKEN | WORD | Varies | HP Token list |
| 08h | Start | WORD | Varies | Position in the CMOS |
| 0Ah | Width | BYTE | Varies | Width of the token in bits |
| 0Bh | Mask | BYTE | Varies | Mask to apply when reading CMOS data |
| 0Ch | Token | BYTE | Varies | Bit 0: If set, this token is a CMOS CRC |

TABLE 4-continued

| Offset | Name | Length | Value | Description |
|---|---|---|---|---|
| | Information | | | Bit 1: If set Checksum bit |
| | | | | Bit 2: Admin password |
| | | | | Bit 3: User password |
| | | | | Bit 4..Bit 7 |
| 0Dh | Extra information | DWORD | Varies | Extra information |
| | | | | If NULL, no extra information is available |

The data contained within table 128 is static and constructed prior to shipment of the computer system 100. The mapping between the tokens 254 to 258 and the CMOS parameter access data 260 to 264 allows an operating system level program, or a higher level program, to access and vary the CMOS parameters 104. The offsets 00h to 05h in Table 4 above correspond to the headers 248 to 252 of FIG. 2. The offsets 06h to 0Dh in Table 4 above correspond to the CMOS parameter data 260 to 264 of the entries in table 128 of FIG. 2.

Figure 3:
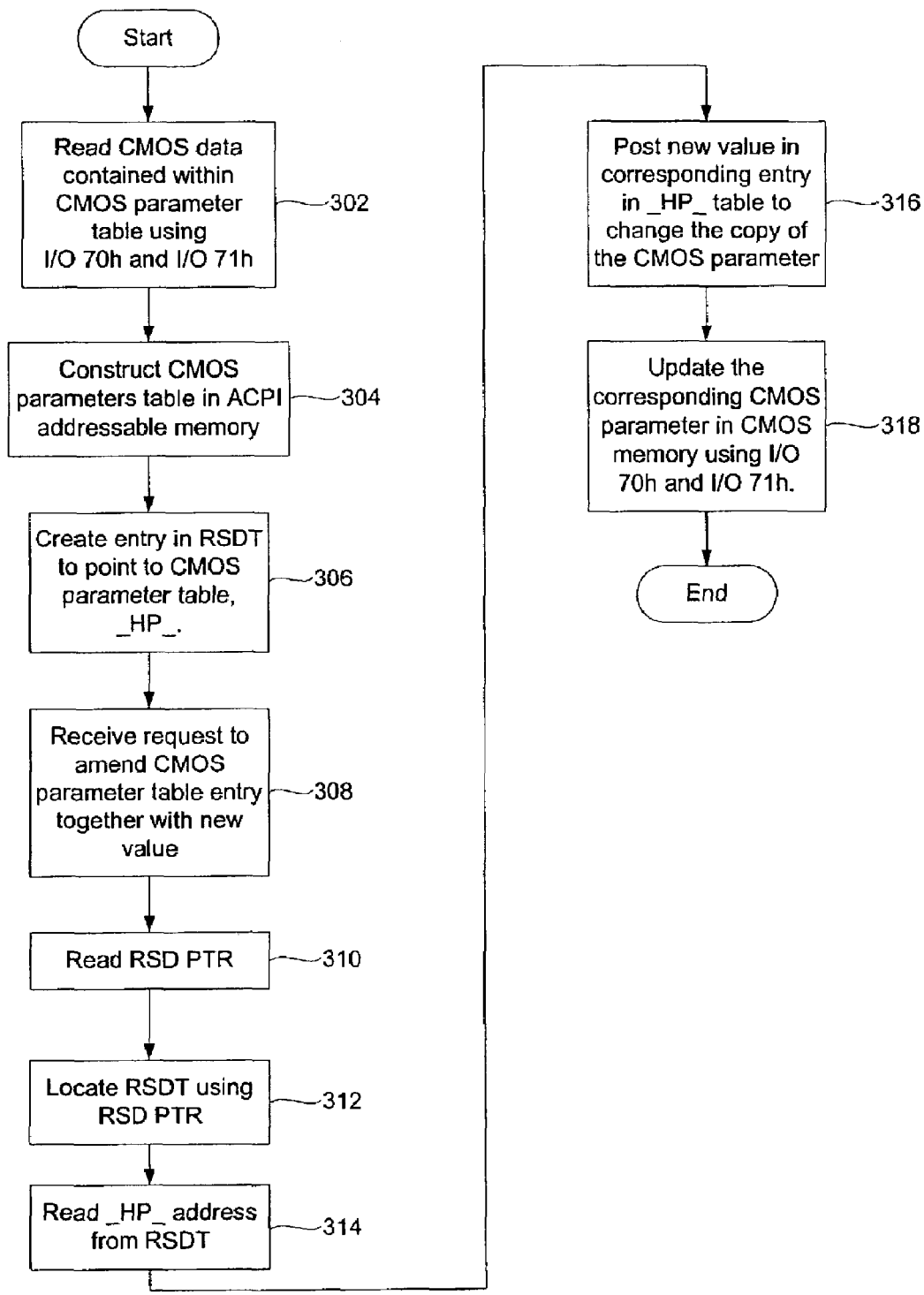
FIG. 3 illustrates a flowchart showing the operation of the first embodiment.

Referring to FIG. 3, there is shown a flowchart 300 of the operations performed by an embodiment of the present invention. At step 300, the BIOS manager 118 reads, via the interface 120 and the interrupt service routines 130, the values contained within the CMOS registers 104. The CMOS parameters table 128 is constructed in ACPI addressable memory space at step 304. An appropriate entry is made in the RDS table 126 to allow the BIOS manager 118 access to the CMOS parameters table 128 at step 306.

The BIOS manager 118 receives, at step 308, a request to change one of the CMOS parameters 104 together with the new value for that entry. At step 310, the BIOS manager 118 reads the ACPI RSD PTR 124. The BIOS manager 118 uses the ACPI RSD PTR 124 to locate and access the RSD table 126 at step 312. The _HP_entry in the RSD table 126 is read at step 314 and used at step 316 to locate and modify the appropriate CMOS parameter within the _HP_table 128. The modified CMOS parameter is written, using the I/O 70h and I/O 71h ports 130, to the appropriate physical address within the CMOS memory 106 at step 318; the addresses having been obtained from the CMOS parameter access data 260 to 264, via the corresponding tokens.

Although the above embodiment uses a two-stage form of indirect addressing to locate and access the CMOS parameters, embodiments are not limited to such an arrangement. Embodiments can be realised in which a more direct form of addressing is used to locate and access the CMOS parameters.

Furthermore, the above embodiments have been described with reference to a 32-bit GUID and a 32-bit offset. However, embodiments of the present invention are not limited to such an arrangement. Embodiments can be realised in which the number of bits used to represent the GUID and the offset are different. The difference may stem from, for example, system specifications. For example, within a 32-bit system, the maximum address size is 32-bits. Hence, the offset would be a 32-bit offset. However, within a 64-bit system, the offset may have 64-bits. It will be appreciated that the GUID and offset may, in general, have n-bits, where n can be selected according to addressing requirements.

Still further, to maintain compatibility between 32 and 64 bit systems, the GUID may have 32-bits and the offset may have 64 bits. In this way, a 64-bit address space may be made accessible for 32-bit software since the 64-bit address space is indirectly addressed using the first 32-bit GUID to locate a corresponding 64-bit address.

The above embodiments have been described in terms if using embodiments of the present invention to address the CMOS parameters. However, it will be appreciated that embodiments of the present invention can be used to address any physical address space. For example, in addition to, or instead of, mapping the CMOS parameters, the table 128, together with appropriate entries, could be used to address other hardware devices or other areas of the physical address space. Such another area of the CMOS address space may relate to, for example, a SEEPROM, or any other device that is mapped into the physical address space. Suitably, preferred embodiments of the present invention encode the GUID entries 236 to 240 of the table 128 to allow the device, device type or type of address space, to which the associated offsets 242 to 246 relate, to be identified. For example, the first GUID 236 may be encoded to indicate that the associated offset 242 relates to a CMOS parameter while the second GUID 238 may be encoded to indicate that the associated offset 244 relates to a SEEPROM. Preferably, GUIDs of physical addresses that relate to the same device are grouped within the table 128. Both encoding the GUIDs so that they relate to the same device or related physical addresses and grouping related GUIDs allows traversing the table and locating a desired physical address to be performed more efficiently.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data processing system comprising:
   an operating system and a physical address space, the physical address space being inaccessible by the operating system;
   the system further comprising:
   a first data structure, accessible by the operating system, for providing a mapping between at least one entry in the data structure and a corresponding address, the corresponding address being a physical address in the physical address space, and
   an audible user interface that outputs an audible representation of a set of data contained within the first data structure.

2. A data processing system as claimed in claim 1, in which the first data structure comprises at least one index to locate within the first data structure the mapping between the at least one entry and the corresponding address.

3. A data processing system as claimed in claim 2, in which the first data structure comprises a first plurality of indices which relate to at least one of a first device mapped into the physical address space or first respective addresses of a portion of the physical address space.

4. A data processing system as claimed in claim 3, in which the first data structure comprises a second plurality of indices which relate to at least one of a second device mapped into the physical address space or second respective addresses of a portion of the physical address space.

5. A data processing system as claimed in claim 1, in which the first data structure is located using a second data structure.

6. A data processing system as claimed in claim 1, in which the physical address space corresponds to a device.

7. A computer program element comprising code means for implementing a system as claimed in claim 1.

8. A computer program product comprising a computer readable storage medium having stored thereon a computer program element as claimed in claim 7.

9. A data processing system comprising an operating system and a physical address space; the physical address space being inaccessible by the operating system; the system further comprising a first data structure, accessible by the operating system, for providing a mapping between at least one entry in the data structure and a corresponding address; the corresponding address being a physical address in the physical address space, and in which the first data structure is a first power management data structure.

10. A data processing system as claimed claim 9, in which the first data structure is an ACPI data structure.

11. A data processing system as claimed in claim 10, in which the ACPI data structure is a table.

12. A data processing system comprising an operating system and a physical address space; the physical address space being inaccessible by the operating system; the system further comprising a first data structure, accessible by the operating system, for providing a mapping between at least one entry in the data structure and a corresponding address; the corresponding address being a physical address in the physical address space,
   in which the first data structure is located using a second data structure, and
   in which the second data structure is at least one of an ACPI Root System Description Table Pointer or an ACPI Root System Description Table.

13. A data processing system comprising an operating system and a physical address space; the physical address space being inaccessible by the operating system; the system further comprising a first data structure, accessible by the operating system, for providing a mapping between at least one entry in the data structure and a corresponding address; the corresponding address being a physical address in the physical address space,
   in which the physical address space corresponds to a device, and
   in which the device is a memory for storing set-up data for initialising the data processing system.

14. A data processing system as claimed in claim 13, in which the memory is a CMOS memory and the set-up data are the CMOS parameters.

* * * * *